United States Patent Office 2,762,729
Patented Sept. 11, 1956

2,762,729

METHOD OF REMOVING SCALE FROM FERROUS WORKPIECES

Roland B. Snow, Pittsburgh, Pa., assignor to United States Steel Corporation, a corporation of New Jersey No Drawing. Application May 27, 1955,
Serial No. 511,787

5 Claims. (Cl. 134—19)

This invention relates to the removal of scale from ferrous metals and more particularly to the removal of furnace scale from steel heated to forging temperature.

During heating to forging temperatures, steel ingots, blooms, slabs and billets develop a so-called "furnace" scale composed of wüstite ($FeO_x$), magnetite ($Fe_3O_4$) and in most cases a thin surface layer of hematite ($Fe_2O_3$). If not removed, this scale tends to remain on the surface during forging resulting in defects in the forged product. In the case of semi-finished workpieces such as slabs the scale is frequently removed in the first stand of the roughing mill, called a scale breaker, wherein the scale is cracked and then removed by hydraulic sprays. In forging other sections, due to the shape thereof, high pressure sprays alone are used to remove the scale. At certain stages of manufacture, some workpieces are cooled to room temperature so the scale can be removed by shot blasting and the like processes. Even in those processes of removing scale where the workpiece is not cooled to room temperature, there is considerable heat loss in the article due to the time involved and the sprays used which limits the amount of work that can be done without reheating.

It is accordingly an object of this invention to provide a method of removing furnace scale from heated workpieces without a substantial heat loss.

It is a further object to provide a method of removing furnace scale from heated workpieces which does not add materially to the cost of the heating or forging operation.

I have discovered that furnace scale can be liquified and thereby removed from steel at a considerably lower temperature than the fusing temperature of scale which is ordinarily above about 1400° C. Aside from the expense involved in heating to such a high temperature, steel itself tends to fluidify and become excessively oxidized or "burned" at such temperatures. In accordance with the teachings of this invention, I contact furnace scale with calcium oxide (lime) or a lime-containing material after the workpiece has been heated to a forging temperature above about 1080° C. but less than 1400° C. At about 1080° C., the mixture of lime, magnetite and wüstite starts to fluidify and at ordinary forging temperatures well below 1400° C. and but slightly above 1080° C. becomes a very fluid liquid which will either flow off or can easily be blown off the heated metal. By experimentation, I have determined that within the limits of 5 to 60 parts CaO and 95 to 40 parts scale, the liquids formed at temperatures above 1080° C. are quite fluid.

As a typical example, a mixture of approximately 60 parts FeO and 40 parts CaO at 1200° was so fluid that it flowed freely from a crucible even though it contained a large quantity of CaO as small, individual crystals.

A preferred application of this method of removing scale is from billets heated for extrusion. Such billets are customarily heated while suspended. The lime may easily be applied thereto by blowing it through a port in the furnace as the billet approaches the exit end. While lime is preferred, a number of lime-containing compounds such as calcium ferrite ($CaO \cdot Fe_2O_3$), dicalcium ferrite ($2CaO \cdot Fe_2O_3$), calcium carbonate ($CaCO_3$) and calcium hydroxide ($Ca(OH)_3$) may be used.

In other embodiments, round billets may be rolled in a powdered lime or lime-containing compound after removing from the heating furnace. Other shapes of billets and slabs may likewise be brought into contact with lime or a lime-containing compound after removal from the furnace by dipping them in the lime or lime-containing compound or spraying or blowing it thereon.

The lime or lime-containing compound should preferably be in a dry, powdered form substantially unreacted with water or carbon dioxide. To obtain such condition, free and freshly burned lime should be used; but of course the lime may be partially reacted with water vapor or carbon dioxide so long as an undesirable amount of water or calcium carbonate is not present. Dry calcium carbonate ($CaCO_3$) and calcium hydroxide ($Ca(OH)_2$) may be successfully used if sufficient temperature or time of contact is allowed to calcine these starting materials to free lime or a lime-bearing slag on the surface of the workpiece. Normally the heat required to separate $CO_2$ and $H_2O$ from their appropriate compounds will absorb heat from the workpiece and may cool the outer scale layer to such an extent that the resulting lime will not form sufficient slag to completely remove the solid scale from the workpiece. Since the lime or lime-containing compound will ordinarily not be heated, the cooling effect thereof may be offset by mixing it with fuel oil, tar or other combustible material prior to contacting the scale on the heated workpiece therewith.

The process is equally applicable to all carbon and low alloy steels though it is not particularly effective for removing scale from steels containing large amounts of chromium or nickel or both. An additional advantage of the process of this invention is that the slag resulting from liquifying scale with lime can be used in charging open hearths and the like to thereby recover the iron.

This application is a continuation-in-part of my copending application Serial No. 362,163, filed June 16, 1953, now abandoned.

While I have described several specific embodiments of my invention, it will be understood that these embodiments are merely for the purpose of illustration and description and that various other forms may be devised within the scope of my invention, as defined in the appended claims.

I claim:

1. A method of removing scale from the the surface of heated ferrous bodies comprising heating the surface at least of said bodies to a temperature between about 1080° C. and 1400° C. and while at such temperature contacting said surface with calcium oxide in solid form.

2. A method of removing scale from the surface of heated ferrous bodies comprising heating the surface at least of said bodies to a temperature between about 1080° C. and 1400° C. and while at said temperature contacting said surface with a lime-containing material in solid form.

3. A method of removing scale from the surface of heated ferrous bodies comprising heating the surface at least of said bodies to a temperature between about 1080° C. and 1400° C. and while at said temperature contacting said surface with powdered lime to thereby liquify said scale.

4. A method of removing scale from the surface of heated ferrous bodies comprising heating the surface at least of said bodies to a temperature between about 1080° C. and 1400° C. and while at such temperature contacting said surface with a mixture comprising a powdered lime-containing material and a combustible.

5. A method of removing scale from the surface of heated ferrous bodies comprising heating the surface at least of said bodies to a temperature between about 1080° C. and 1400° C. and while at such temperature contacting said surface with a substantially dry, free lime-containing compound.

References Cited in the file of this patent

FOREIGN PATENTS 13,651    Great Britain _____ of 1894